(12) United States Patent
Shackleton et al.

(10) Patent No.: US 11,763,005 B2
(45) Date of Patent: Sep. 19, 2023

(54) DYNAMIC SECURITY POLICY

(71) Applicant: BRITISH TELECOMMUNICATIONS PUBLIC LIMITED COMPANY, London (GB)

(72) Inventors: Mark Shackleton, London (GB); Fadi El-Moussa, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 516 days.

(21) Appl. No.: 16/762,284

(22) PCT Filed: Oct. 11, 2018

(86) PCT No.: PCT/EP2018/077781
§ 371 (c)(1),
(2) Date: May 7, 2020

(87) PCT Pub. No.: WO2019/091697
PCT Pub. Date: May 16, 2019

(65) Prior Publication Data
US 2021/0182404 A1   Jun. 17, 2021

(30) Foreign Application Priority Data
Nov. 7, 2017   (EP) .................................... 17200478

(51) Int. Cl.
*G06F 21/57* (2013.01)
*G06N 20/00* (2019.01)
(Continued)

(52) U.S. Cl.
CPC ........ *G06F 21/577* (2013.01); *G06F 9/45558* (2013.01); *G06F 18/214* (2023.01);
(Continued)

(58) Field of Classification Search
CPC .... G06F 21/577; G06F 9/45558; G06F 21/54; G06F 2009/45587; G06K 9/6256; G06N 20/00
See application file for complete search history.

(56) References Cited

U.S. PATENT DOCUMENTS

| 6,421,719 B1 | 7/2002 | Lewis et al. |
| 7,552,480 B1 * | 6/2009 | Voss ........................ G06F 21/577 |
| | | 713/150 |

(Continued)

FOREIGN PATENT DOCUMENTS

WO   WO-2017180611 A1   10/2017

OTHER PUBLICATIONS

Li, Tzeng and Yu, Viso: Characterizing Malicious Behaviors of Virtual Machines with Unsupervised Clustering, 2015, IEEE 7th International Conference on Cloud Computing Technology and Science (Year: 2015).*

(Continued)

*Primary Examiner* — Bruce S Ashley
(74) *Attorney, Agent, or Firm* — Patterson Thuente, P.A.

(57) ABSTRACT

A computer implemented method to generate training data for a machine learning algorithm for determining security vulnerabilities of a virtual machine (VM) in a virtualized computing environment is disclosed. The machine learning algorithm determines the vulnerabilities based on a vector of configuration characteristics for the VM.

7 Claims, 5 Drawing Sheets

(51) Int. Cl.
   *G06F 9/455*   (2018.01)
   *G06F 21/54*   (2013.01)
   *G06F 18/214*  (2023.01)

(52) U.S. Cl.
   CPC ............. *G06F 21/54* (2013.01); *G06N 20/00* (2019.01); *G06F 2009/45587* (2013.01)

(56) References Cited

U.S. PATENT DOCUMENTS

| | | | |
|---|---|---|---|
| 9,306,962 B1* | 4/2016 | Pinto | .................. H04L 63/1416 |
| 10,482,245 B2 | 11/2019 | El-Moussa et al. | |
| 10,484,402 B2 | 11/2019 | El-Moussa et al. | |
| 10,623,419 B2 | 4/2020 | El-Moussa et al. | |
| 10,733,295 B2 | 8/2020 | El-Moussa et al. | |
| 10,747,886 B2 | 8/2020 | El-Moussa et al. | |
| 11,423,144 B2 | 8/2022 | El-Moussa et al. | |
| 2014/0082730 A1 | 3/2014 | Vashist et al. | |
| 2014/0344926 A1 | 11/2014 | Cunningham et al. | |
| 2016/0239330 A1 | 8/2016 | Mc Bride et al. | |
| 2016/0350539 A1 | 12/2016 | Oberheide et al. | |
| 2017/0147816 A1 | 5/2017 | Schilling et al. | |
| 2017/0149807 A1 | 5/2017 | Schilling et al. | |
| 2017/0201490 A1 | 7/2017 | Kinder et al. | |
| 2017/0279826 A1* | 9/2017 | Mohanty | ............. H04L 67/1004 |
| 2017/0351860 A1 | 12/2017 | El-Moussa et al. | |
| 2018/0060575 A1 | 3/2018 | El-Moussa et al. | |
| 2018/0060581 A1 | 3/2018 | El-Moussa et al. | |
| 2019/0005246 A1 | 1/2019 | Cherny et al. | |
| 2019/0188392 A1 | 6/2019 | El-Moussa et al. | |

OTHER PUBLICATIONS

Algosec Whitepaper, "Security Policy Management Acrossthe Next Generationdata Center," Security Policy Management Across The Next Generation Data Center, 2015, 10 pages.

Combined Search and Examination Report under Sections 17 and 18(3) for Great Britain Application No. GB1718427.6, dated Apr. 26, 2018, 5 pages.

Combined Search and Examination Report under Sections 17 and 18(3) for Great Britain Application No. GB1718428.4, dated Apr. 26, 2018, 5 pages.

Extended European Search Report for Application No. 17200478.0, dated Jan. 8, 2018, 8 pages.

Extended European Search Report for Application No. 17200479.8, dated Jan. 8, 2018, 9 pages.

International Preliminary Report on Patentability for Application No. PCT/EP2018/077782, dated May 12, 2020, 8 pages.

International Preliminary Report on Patentability for Application No. PCT/EP2018/077781, dated May 12, 2020, 8 pages.

International Search Report and Written Opinion for Application No. PCT/EP2018/077781, dated Jan. 9, 2019, 11 pages.

International Search Report and Written Opinion for Application No. PCT/EP2018/077782, dated Jan. 11, 2019, 11 pages.

Puget J.F., "Machine Learning Algorithm," IT Best Kept Secret is Optimization, Apr. 27, 2016, XP055435087, retrieved from https://www.ibm.com/developerworks/community/blogs/jfp/entry/Machine_Learning_Learning_Machine?lang=en on Dec. 14, 2017, 2 pages.

* cited by examiner

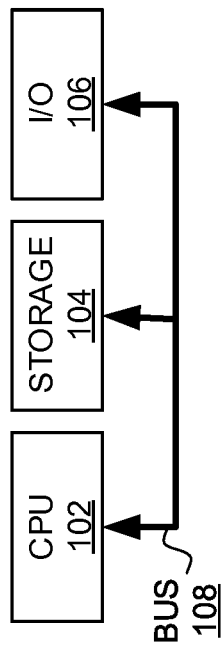
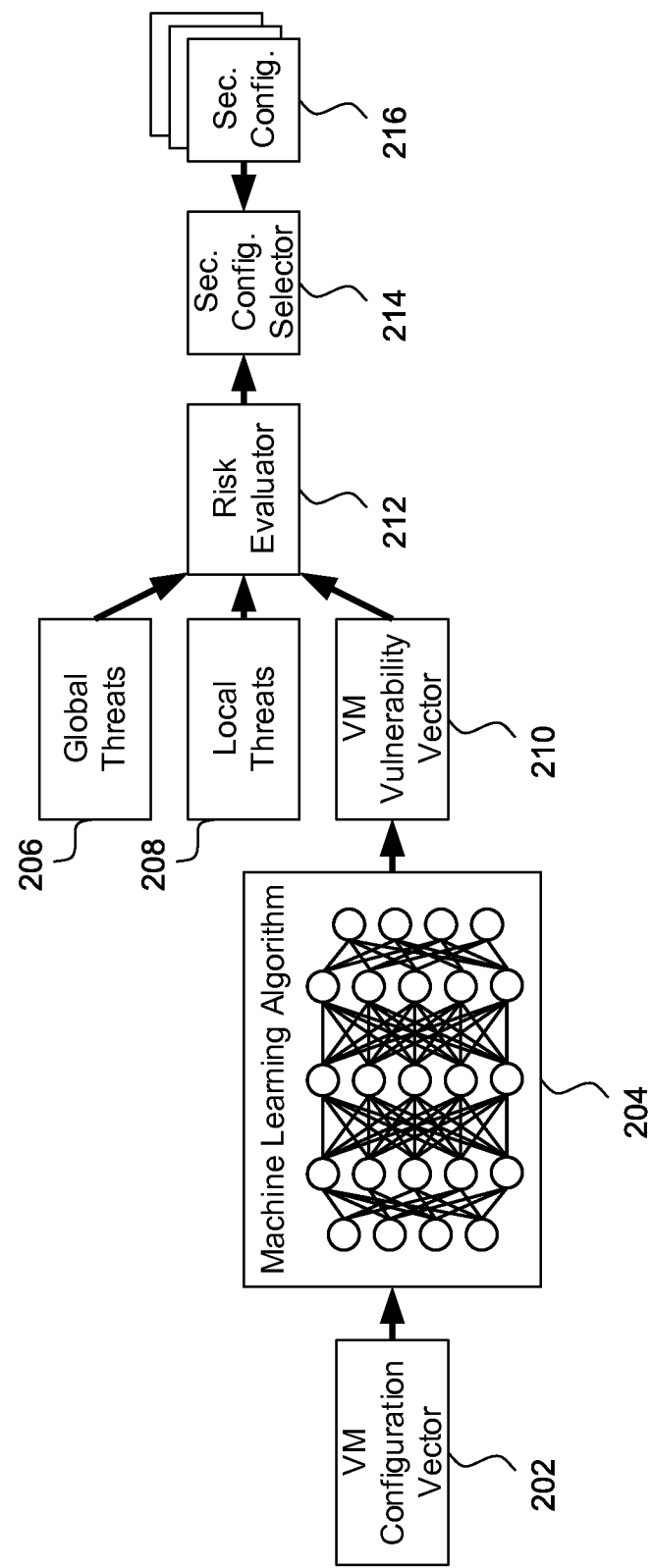

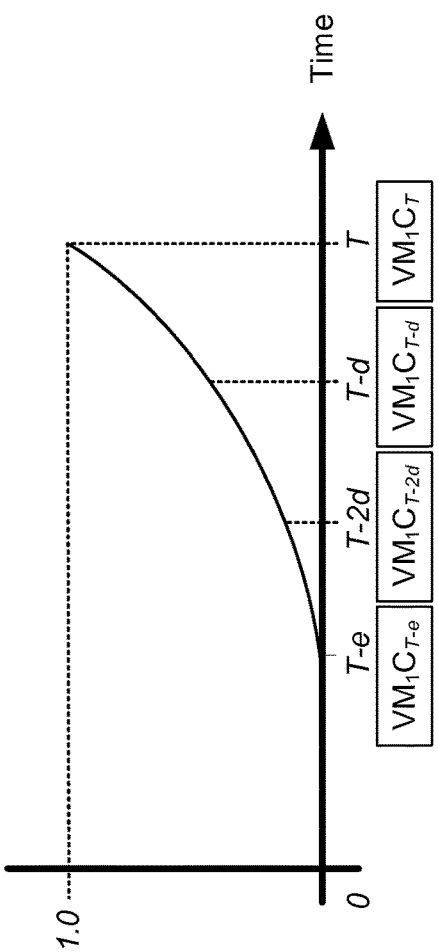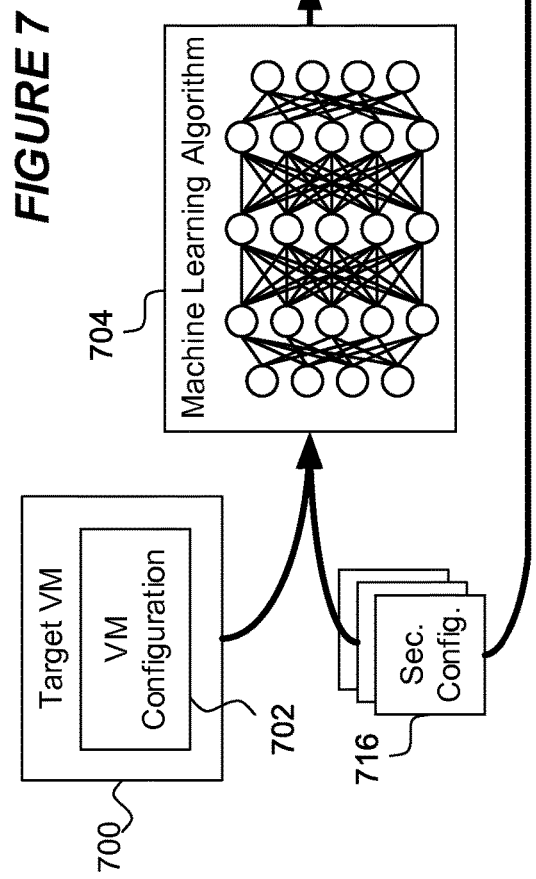

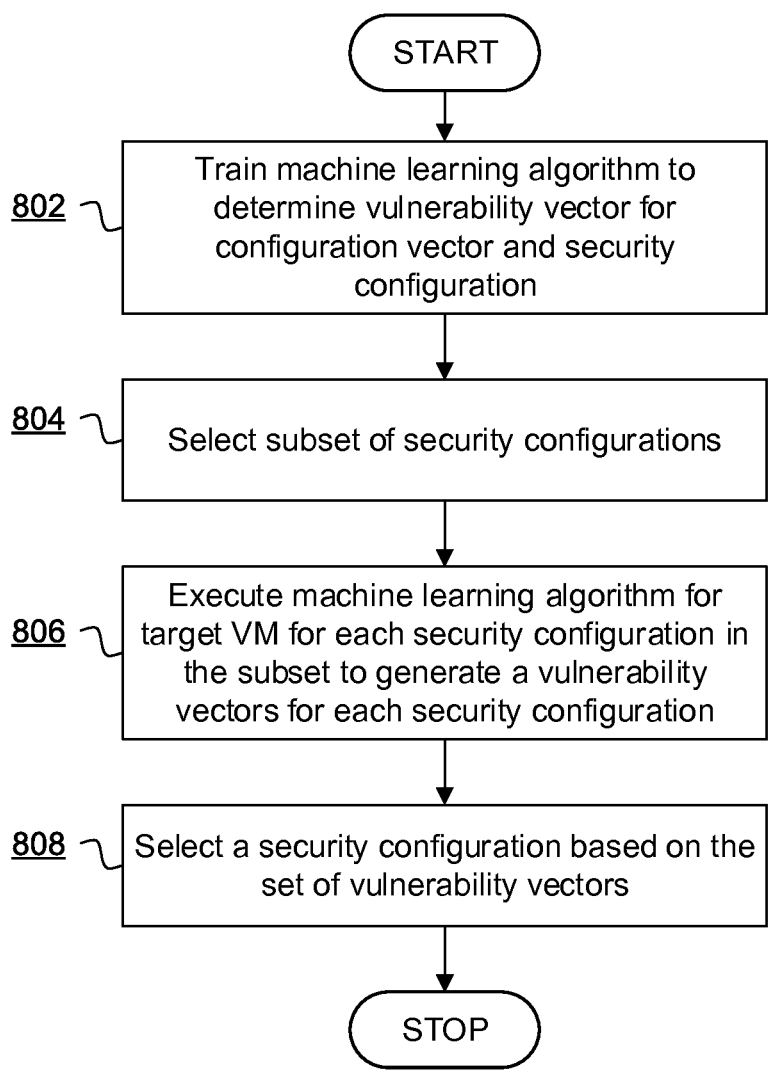

DYNAMIC SECURITY POLICY

PRIORITY CLAIM

The present application is a National Phase entry of PCT Application No. PCT/EP2018/077781, filed Oct. 11, 2018, which claims priority from EP Patent Application No. 17200478.0, filed Nov. 7, 2017, each of which is hereby fully incorporated herein by reference.

TECHNICAL FIELD

The present disclosure relates to the selection of a security policy for a virtualized computer system dynamically.

BACKGROUND

Virtualized computing environments provide for the instantiation and deployment of potentially multiple virtual machines (VMs) as virtual implementations of physical machines. Improving the security of such VMs is an ongoing challenge as security threats continue to develop taking advantage of potential security vulnerabilities in a VM configuration.

Security information and event management (SIEM) products or services track security events from networks and applications. SIEM can be provided as software solutions or network appliances that log the security events and provide visibility and reporting. These can be combined with a Managed Security Service (MSS) by a MSS Provider (MSSP). An MSSP may manage many VMs which involves managing security policies for those machines.

Security policies for a VM defines a security configuration for the machine and specifies how the security of the machine is managed. A security configuration may include configuration characteristics of the VM such as the availability of certain networking resources, the execution of certain applications, the provision of facilities such as encryption of data at rest and/or in transit, the provision of security facilities such as intrusion detection facilities, firewalls, malware and/or virus detection facilities, remediation facilities and the like, a version, level or patch level of one or more components in the VM, operating system (OS) facilities, a frequency of update/patching and other factors as will be apparent to those skilled in the art.

Security configurations are typically fixed or infrequently adapted and so they can easily become out of date and unreflective of current risks or threats to a VM.

Thus, there is a need to provide improvements to the security configuration of VMs.

SUMMARY

The present disclosure accordingly provides, in a first aspect, a computer implemented method to generate training data for a machine learning algorithm for determining security vulnerabilities of a virtual machine (VM) in a virtualized computing environment, the machine learning algorithm determining the vulnerabilities based on a vector of configuration characteristics for the VM, the method comprising: receiving a plurality of VM configuration vectors for each of one or more training VMs, each configuration vector including attributes of a configuration of a VM and having a temporal indication; receiving a security occurrence identification being referable to a VM configuration vector for a training VM based on a temporal indication of the security occurrence, the security occurrence identification including information for defining a vector of vulnerabilities for the training VM associated with the referenced VM configuration vector, and associating the referenced VM configuration vector with the vulnerability vector as a first training example; identifying one or more further VM configuration vectors for the training VM, each of the further VM configuration vectors having temporal indications preceding that of the referenced VM configuration vector; and associating a modified form of the vulnerability vector with each of the further VM configuration vectors as further training examples, the vulnerability vector being modified for each further VM configuration vector by a reverse decay function such that each temporally earlier VM configuration vector is associated with a vulnerability vector indicating vulnerability to a lesser degree.

In some embodiments, the reverse decay function is a 0.5 kt function based on an increasing time past (t) for a chronologically earlier VM configuration vector and a constant (k).

In some embodiments, the method further comprises training the machine learning algorithm based on the training examples to classify a configuration vector for a VM to a vulnerability vector.

In some embodiments, a vector of configuration characteristics includes an indicator of a state of each of a plurality of configuration characteristics for a VM.

In some embodiments, a vulnerability vector includes an indicator of each of a plurality of security vulnerabilities of a VM.

The present disclosure accordingly provides, in a second aspect, a computer system including a processor and memory storing computer program code for performing the methods set out above.

The present disclosure accordingly provides, in a third aspect, a computer program element comprising computer program code to, when loaded into a computer system and executed thereon, cause the computer to perform the methods set out above.

BRIEF DESCRIPTION OF THE FIGURES

Embodiments of the present disclosure will now be described, by way of example only, with reference to the accompanying drawings, in which:

FIG. 1 is a block diagram of a computer system suitable for the operation of embodiments of the present disclosure.

FIG. 2 is a component diagram of an arrangement for selecting a security configuration for a target VM in accordance with embodiments of the present disclosure.

FIG. 5 depicts the application of a reverse decay function such that temporally earlier training VM configurations are associated with vulnerability vectors indicating vulnerability to a lesser degree in accordance with embodiments of the present disclosure.

FIG. 7 is a component diagram of an arrangement for determining a security configuration for a target VM in accordance with embodiments of the present disclosure.

FIG. 8 is a flowchart of a method for determining a security configuration for a target VM in accordance with embodiments of the present disclosure.

DETAILED DESCRIPTION OF EMBODIMENTS

Figure 3:
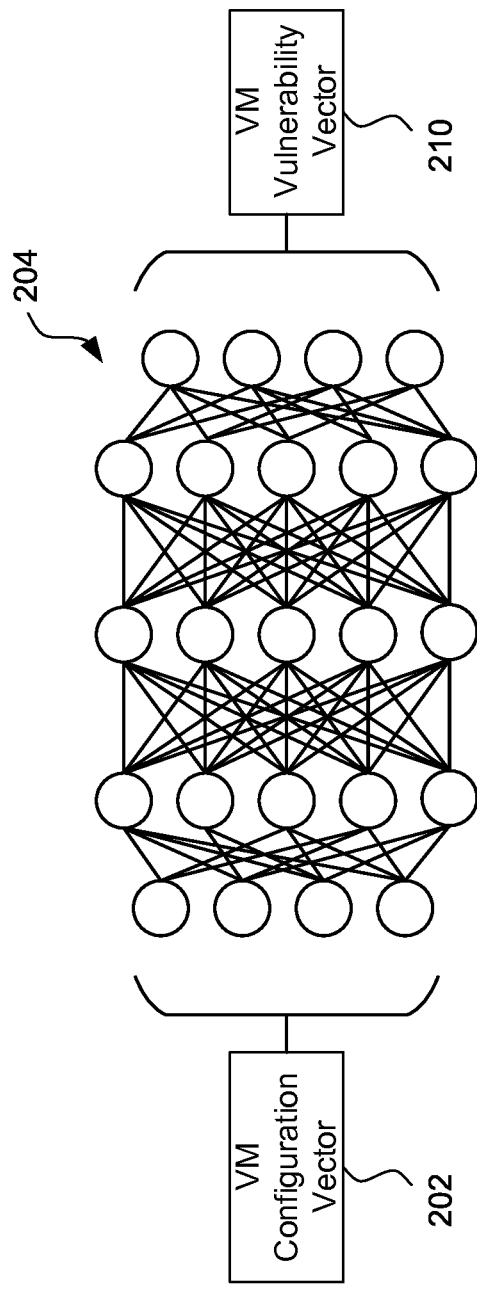
FIG. 3 illustrates an arrangement of the machine learning algorithm of FIG. 2 in accordance with embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

FIG. 2 is a component diagram of an arrangement for selecting a security configuration 216 for a target VM in accordance with embodiments of the present disclosure. The security configuration 216 is one of a set of possible security configurations each aligning to a security policy, and is selected by a security configuration selector 214 as a hardware, software, firmware or combination component adapted to select a security configuration for a target VM based on an evaluated measure of risk. The evaluated measure of risk is determined by a risk evaluator 212 as a hardware, software, firmware or combination component based on parameters including at least: global security threat information 206 such as may be provided by third party entities such as security monitoring agencies, attack detection and monitoring agencies and the like; local security threat information 208 such as may be determined by local monitoring and/or threat determination measures such as security facilities of a virtualized computing environment, network, local appliances or the like; and a vulnerability vector 210 for the target VM, the vulnerability vector being determined by a machine learning method based on a configuration of the target VM as described below. Thus, in use, the risk evaluator 212 evaluates a measure of risk for the target VM to inform a determination by the security configuration selector 214 of an appropriate security configuration 216 for application to the VM, A security configuration 216, as an embodiment of a security policy, can include, inter alia: the installation, deinstallation, modification or configuration of one or more resources for the VM including, for example, software, patches, services, security facilities and the like; the deployment of one or more specific security protective measures such as intrusion detection, virus detection, malware detection, network scanning, real-time scanning, network monitoring, network configuration, or other facilities as will be apparent to those skilled in the art; patching, updating, replacement or reconfiguration of operating system, kernel, hypervisor, memory, storage, processor or other resources of the target VM; and other security configuration measures.

In addition to the threat information 206, 208, the security configuration selector 214 is responsive to the risk evaluation based on a determination of a degree of vulnerability of the target VM. The degree of vulnerability is reflected in the VM vulnerability vector 210 as a vector of metrics each corresponding to an indication of an extent of a weakness of the target VM to exploitation. For example, the opening of networking ports introduces a vulnerability to exploitation of those open ports by malicious entities. The nature, number, extent and security of such open ports can be reflected as one or more metrics in the VM vulnerability vector 210 for the target VM. The risk evaluated by the risk evaluator 212 thus constitutes a metric combining a vulnerability of the target VM with matched threats (local and/or global).

The vulnerability vector 210 is determined based on a supervised machine learning algorithm 204 for inferring a function from labelled training data. The machine learning algorithm 204 is trained using training data consisting of training examples each having an input vector and desired output vector. The machine learning algorithm 204 thus analyses the training data to produce an inferred function which can be used for mapping new examples, including an input vector for the target VM to infer an output vector for the target VM. The implementation of such supervised machine learning algorithms is beyond the scope of this specification and will be apparent to those skilled in the art.

In embodiments of the present disclosure, the machine learning algorithm 204 is trained to identify a VM vulnerability vector 210 for a VM based on a vector of configuration characteristics of the VM known as a VM configuration vector 202. The VM configuration vector 202 is a vector of metrics each corresponding to one or more configuration characteristics of a VM. For example, the VM configuration vector 202 can encode a VM configuration state including and/or based on, inter alia: log file data; operating system type, version and/or update; applications, services, features or other components installed in the VM; user information for the VM; geographic location of the VM or hardware used for instantiating, supporting, running or managing the VM; network information pertaining to the VM such as a network topology, network connections and the like; and security features installed in the VM such as intrusion detection, malware detection, antivirus, firewall and the like. Thus, in use, the machine learning algorithm 204 determines a VM vulnerability vector 210 for a VM configuration vector 202, as depicted in FIG. 3.

Training the supervised machine learning algorithm 204 is necessary. In particular, the machine learning algorithm 204 is trained to generate a VM vulnerability vector 210 for a VM configuration vector 202 to reflect known or realized security occurrences. A security occurrence includes an attack or other security event that corresponds, at least in part, to the realization of the effect of a security vulnerability existing in a VM having a particular VM configuration. Thus, training examples are required for the machine learning algorithm for which a security occurrence was realized and including a configuration vector 202 for a training VM and a corresponding vulnerability vector 210 in view of the security occurrence. The identification of such training examples is particularly challenging, not least because a large number of training examples is required to provide effective training for the machine learning algorithm 204.

Figure 4:
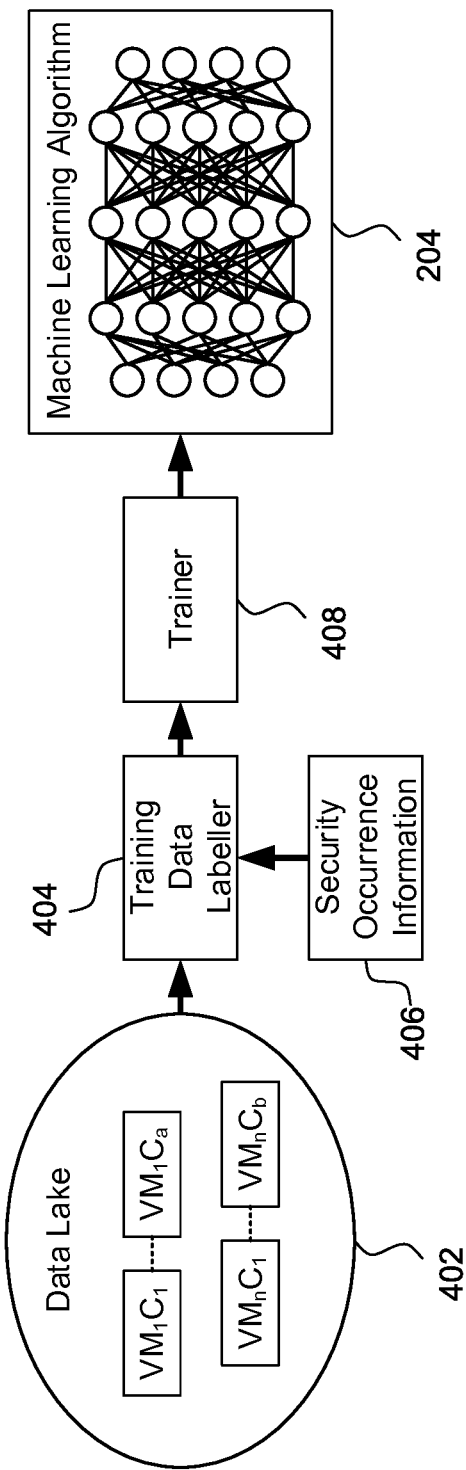
FIG. 4 is a component diagram of an arrangement for training the machine learning algorithm of FIGS. 2 and 3 in accordance with embodiments of the present disclosure.

FIG. 4 is a component diagram of an arrangement for training the machine learning algorithm 204 of FIGS. 2 and 3 in accordance with embodiments of the present disclosure. Embodiments of the present invention draw on existing repositories of VM configurations as a source of training examples for the machine learning algorithm 204. In particular, it is known good practice to gather VM configuration information in "data lakes" 402 i.e. data storage repositories for storing data in potentially diverse schema or structural forms such as files or binary large objects (blobs). Such data lakes 402 provide an opportunity to gather VM configuration information for training VMs. For example, the data lake of FIG. 4 includes multiple VM configuration information for a first training VM, $VM_1$, ranging temporally from a first configuration $VM_1C_1$ to configuration $VM_1C_a$. Similarly, multiple VM configuration information for other VMs is provided such as VM, having configuration information ranging temporally from first configuration $VM_nC_1$ to configuration $VM_nC_b$, and so on. Notably, the temporal range of configuration information means that each set of configuration information for a VM is associated with some temporal indication such as a time of its applicability or similar. Thus, from such configuration information, multiple VM configuration vectors 202 can be generated.

FIG. 4 includes a training data labeler 404 as a software, hardware, firmware or combination component for generating labelled training data for a machine learning trainer 408 to train the machine learning algorithm 204. The labeler 404 thus formulates each training example as an input VM configuration vector 202, such as based on configuration information for a VM from the data lake 402, where the training example is labelled by a desired output vector as a VM vulnerability vector 210. The VM vulnerability vector 210 is generated based on security occurrence information 406 received in respect of VMs for which configuration data is available in the data lake 402.

The security occurrence information 406 relates to a security attack or other security event occurring in respect of a training VM and includes time information for identifying a particular configuration in the data lake 402 of the training VM at the time of the security occurrence. Thus, the security occurrence is referable to a VM configuration vector derived based on a timed VM configuration in the data lake. Further, the security occurrence information 406 serves as a basis for defining a VM vulnerability vector 210 for the training VM because the security occurrence information 406 includes sufficient information to populate a VM vulnerability vector. Thus, by way of the security occurrence information 406, the training data labeler 404 generates labelled training examples each as a VM configuration vector 202 from the data lake 402 identified and labelled by a VM vulnerability vector derived from the security occurrence information 406.

The security occurrence information 406 relates directly to discrete VM configurations in the data lake based on the timing of the security occurrence and the temporal indication for each VM configuration, and therefore, to discrete VM configuration vectors 202. Thus there will be many (probably a vast majority) VM configurations derivable from the data lake 402 for which no security occurrence information is available and, therefore, for which no VM vulnerability vector 210 can be determined. For these VM configurations, the training data labeler 404 employs a reverse decay strategy to apply a security occurrence 406 to temporally previous VM configuration vectors 202 for the same VM. That is to say that VM configurations occurring prior to a configuration at which a security occurrence 406 was observed can be presumed to contribute to the vulnerability of the VM at the time of the security occurrence 406. In this regard, such prior VM configurations can be considered to have a "pre-vulnerability". The distance, temporally, that such a presumption can be applied is configurable such that only configurations occurring temporally prior but temporally "close" (according to a formal definition) to that for which the security occurrence 406 occurred are so labelled. The presumption is appropriate because VM configuration is an evolutionary process such that configuration changes occurring over time are cumulative. Accordingly, a single configuration known to be demonstrably vulnerable by virtue of a security occurrence 406 is reasonably considered to impart at least a degree of vulnerability on temporally previous configurations, at least within a configurable or predetermined temporal window.

FIG. 5 depicts the application of a reverse decay function such that temporally earlier training VM configurations are associated with vulnerability vectors indicating vulnerability to a lesser degree in accordance with embodiments of the present disclosure. As can be seen in the graph of FIG. 5, a security occurrence 406 is known to have occurred in respect of a security configuration $VM_1C_T$ applicable at a time, T. Thus, vulnerability of relevant features in the VM vulnerability vector 210 can be considered maxima or unity for this particular VM configuration. Accordingly, the graph shows that such a VM configuration has a degree of vulnerability (for a discrete vulnerability in the VM vulnerability vector 210) of 1.0.

Drawing back from this time T temporally, a previous VM configuration occurring at time T-d (some time delta d prior to T), $VM_1C_{T-d}$, is labelled as a training example with a modified form of the VM vulnerability vector for $VM_1C_T$ applicable at a time, T. In particular, as illustrated in the graph of FIG. 5, the degree of vulnerability indicated in the modified vulnerability vector for $VM_1C_{T-d}$ is some degree lower than that for $VM_1C_T$. Similarly, a further prior VM configuration occurring at T-2d, $VM_1C_{T-2d}$, is labelled as a training example with a further modified form of the VM vulnerability vector for $VM_1C_T$. Thus, a modified form of the vulnerability vector for $VM_1C_T$ is used to label training examples for multiple preceding VM configurations. In some embodiments, the vulnerability vector is modified for each further VM configuration vector by a reverse decay function such that each temporally earlier VM configuration vector is associated with a vulnerability vector indicating vulnerability to a lesser degree. In one embodiment, the reverse decay function is $0.5^{kt}$ where t is an increasing time past for a chronologically earlier VM configuration vector and k is a constant for governing the vulnerability duration i.e. how far temporally back from a security occurrence configurations are to be employed as training examples. Note that the increasing value of t for chronologically earlier VM configurations with each earlier VM configuration being labelled by an increasingly decayed degree of vulnerability provides the reverse decay function such that decay increases backwards chronologically for earlier VM configurations.

Thus, in this way, a number of useful training examples for the machine learning algorithm 204 is increased by interpolating training examples from prior VM configurations based on security occurrence information. Notably, the nature of the security occurrence information 406 can itself lead to a decay or reduction of a degree of vulnerability even for a VM configuration applicable at the time of the occurrence, depending on the type of occurrence. For example, where the occurrence 406 is a confirmed security attack, then no reduction in the degree of vulnerability may apply. However, where the occurrence 406 is one of a number of security events of potentially differing severity, such as a virus detection and removal, a suspicion of intrusion and the like, then the degree of vulnerability reflects in the VM vulnerability vector can be reduced according to predetermined measures or factors so as to emphasize vulnerability of a VM configuration in the event of a confirmed attack and to relatively de-emphasize vulnerability in the event of less significant security events.

Figure 6:
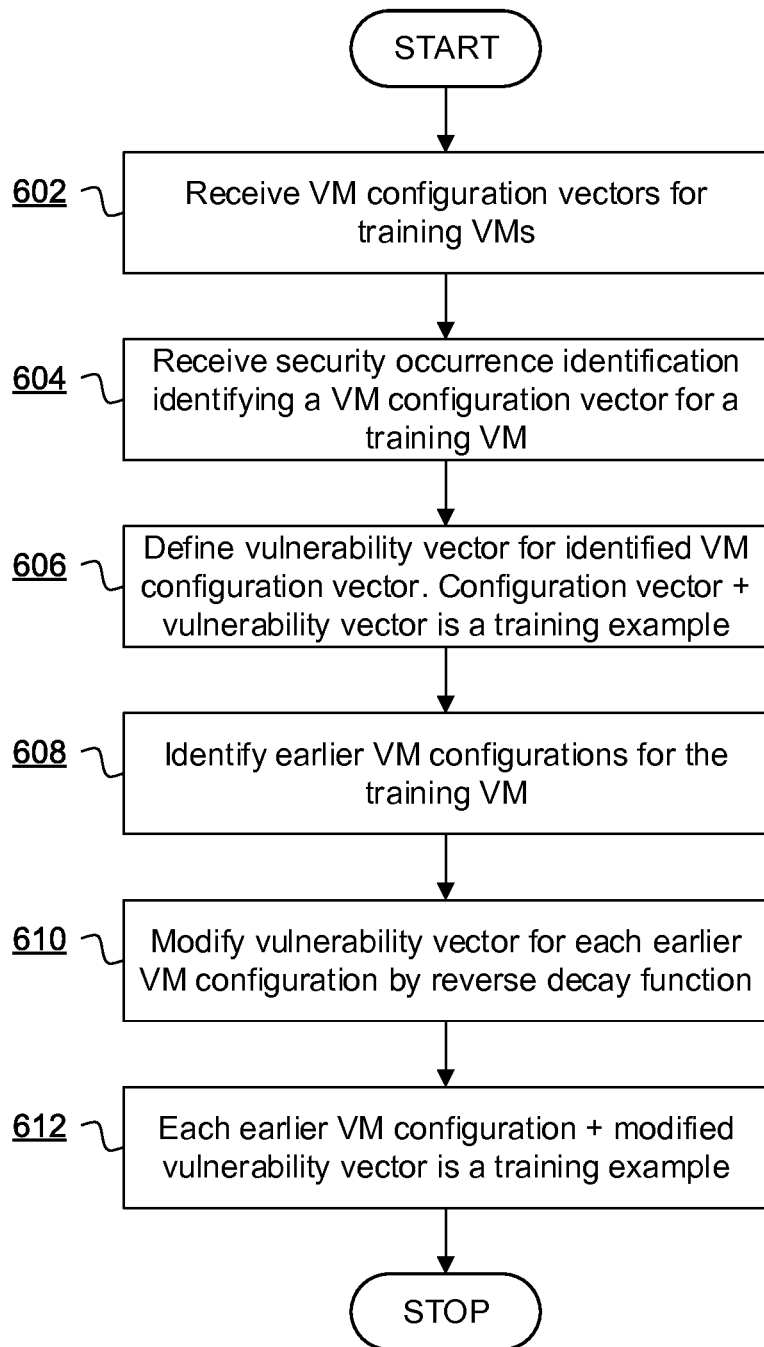
FIG. 6 is a flowchart of a method to generate training data for the machine learning algorithm of FIGS. 2 and 3 in accordance with embodiments of the present disclosure.

FIG. 6 is a flowchart of a method to generate training data for the machine learning algorithm of FIGS. 2 and 3 in accordance with embodiments of the present disclosure. Initially, at 602, a plurality of VM configuration vectors 202 for each of one or more training VMs are received. Each received configuration vector 202 includes attributes of a configuration of a training VM and has a temporal indication such as a time of applicability of the VM configuration corresponding to the configuration vector 202. At 604, a security occurrence identification 406 is received, the security occurrence identification 406 being referable to a VM configuration vector 202 for a training VM based on a time or other temporal indication of the security occurrence 406. The security occurrence identification 406 includes information for defining a VM vulnerability vector 210 for the training VM associated with the VM configuration vector 202. At 606, the referenced VM configuration vector 202 is associated with (labelled by) the VM vulnerability vector 210 as a first training example. At 608, one or more further VM configuration vectors 202 for the training VM are identified. Each of the further VM configuration vectors 202 has a temporal indication preceding that of the referenced VM configuration vector such that they applied earlier than the referenced VM configuration. At 610 a modified form of the vulnerability vector 210 is associated with each of the further VM configuration vectors 202 as further training examples, the vulnerability vector 210 being modified for each further VM configuration vector by a reverse decay function. At 612 each temporally earlier VM configuration vector 210 is associated with a vulnerability vector indicating vulnerability to a lesser degree.

FIG. 7 is a component diagram of an arrangement for determining a security configuration for a target VM 700 in accordance with embodiments of the present disclosure. Many of the features of FIG. 7 are identical to those described above with respect to FIG. 2 and these will not be repeated here. The machine learning algorithm 704 of FIG. 7 differs from that previously described in that it is trained for VM configuration vectors 202 that include an identification of a security configuration 716 applicable for a VM. These training example VM configuration vectors 202 are labelled by VM vulnerability vectors 210 as previously described, though the inclusion of the security configuration information with the VM configuration vector 202 encodes the security configuration within the trained machine learning algorithm 704. Subsequently, in use in operation, a VM configuration vector 202 for the target VM can be supplemented by one or more prospective security configurations as input to the machine learning algorithm 704 to elicit a VM vulnerability vector 710 reflecting the prospective security configuration. Thus, in this way, it is possible to sample the machine learning algorithm 704 with a VM configuration vector 202 for the target VM supplemented by each of a number of prospective security configurations 716 (i.e. executing the machine learning algorithm 704 multiple times) to elicit multiple VM vulnerability vectors 710, each reflective of a different prospective security configuration.

The approach of FIG. 7 is particularly useful for the selection of a security configuration 730 for a VM in the context of global and/or local threats 706, 708. For example, threats 706, 708 can serve to prioritize the vulnerability features in a VM vulnerability vector 710 such that some vulnerability features are more significant than others in view of the threats posed. For example, a network attack threat involving a particular network protocol can serve to emphasize features in the VM vulnerability vector 710 corresponding to networking, the particular network protocol, and/or applications or features using the network protocol. These features can then be prioritized. Accordingly, executing the machine learning algorithm 704 for a VM configuration vector 202 of the target VM 700 multiple times with different proposed security configurations 716 to elicit multiple VM vulnerability vectors 710, the multiple VM vulnerability vectors can be ranked according to the degree of vulnerability of the prioritized features in order that the security configuration 730 offering the lowest vulnerable in the prioritized features can be selected by a security configuration selector 714.

FIG. 8 is a flowchart of a method for determining a security configuration 730 for a target VM 700 in accordance with embodiments of the present disclosure. Initially, at 802, the machine learning algorithm 704 is trained to determine a vector 710 of security vulnerabilities for the target VM 700 based on a vector 202 of configuration characteristics for the target VM. The machine learning algorithm is trained using training examples each including a configuration for a training VM and an associated vulnerability vector based on an observed security occurrence 406 at the training VM. In particular, each training example includes an identification of one of set of security configurations 716 for the training VM. At 804 the method selects at least a subset of the set of security configurations 716 (potentially all of the security configurations). At 806 the method executes the machine learning algorithm 704 for each security configuration 716 in the selected subset. The machine learning algorithm 704 is executed with a VM configuration vector 202 for the target VM and an identification of each security configuration. The machine learning algorithm 704 therefore generates a set of VM vulnerability vectors 710 including a vulnerability vector for each security configuration 716 in the selected subset. At 808 the method selects a security configuration 730 for the target VM 700 based on the set of VM vulnerability vectors 710.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to generate training data for a machine learning algorithm for determining security vulnerabilities of a virtual machine (VM) in a virtualized computing environment, the machine learning algorithm determining the security vulnerabilities based on a vector of configuration characteristics for the VM, the method comprising:
   receiving a plurality of VM configuration vectors for each of one or more training VMs, each of the plurality of VM configuration vectors including attributes of a configuration of a VM and having a temporal indication;
   receiving a security occurrence identification being referable to a VM configuration vector for a training VM based on a temporal indication of the security occurrence identification,
      the security occurrence identification including information defining a temporally corresponding vector of vulnerabilities for the training VM associated with the referenced VM configuration vector, and
      pairing the referenced VM configuration vector with the temporally corresponding vector of vulnerabilities as a first training example;
   identifying one or more further VM configuration vectors for the training VM, each of the further VM configuration vectors having temporal indications preceding that of the referenced VM configuration vector and no preceding security occurrence identification; and
   pairing a modified form of the vector of vulnerabilities with each of the further VM configuration vectors as further training examples, the vector of vulnerabilities being modified for each further VM configuration vector by a reverse decay function such that each temporally earlier VM configuration vector is associated with a modified vector of vulnerabilities indicating vulnerability to a lesser degree.

2. The method of claim 1, wherein the reverse decay function is a $0.5^{kt}$ function based on an increasing time past (t) for a chronologically earlier VM configuration vector and a constant (k).

3. The method of claim 1, further comprising training the machine learning algorithm based on the training examples to classify a configuration vector for a VM to a vector of vulnerabilities.

4. The method of claim 1, wherein a vector of configuration characteristics includes an indicator of a state of each of a plurality of configuration characteristics for a VM.

5. The method of claim 1, wherein a vector of vulnerabilities includes an indicator of each of a plurality of security vulnerabilities of a VM.

6. A computer system comprising:
   a processor and memory storing computer program code for generating training data for a machine learning algorithm for determining security vulnerabilities of a virtual machine (VM) in a virtualized computing environment, the machine learning algorithm determining the security vulnerabilities based on a vector of configuration characteristics for the VM, by:
      receiving a plurality of VM configuration vectors for each of one or more training VMs, each of the plurality of VM configuration vectors including attributes of a configuration of a VM and having a temporal indication;
      receiving a security occurrence identification being referable to a VM configuration vector for a training VM based on a temporal indication of the security occurrence identification,
   the security occurrence identification including information defining a temporally corresponding vector of vulnerabilities for the training VM associated with the referenced VM configuration vector, and
      pairing the referenced VM configuration vector with the temporally corresponding vector of vulnerabilities as a first training example;
      identifying one or more further VM configuration vectors for the training VM, each of the further VM configuration vectors having temporal indications preceding that of the referenced VM configuration vector and no preceding security occurrence identification; and
      pairing a modified form of the vector of vulnerabilities with each of the corresponding VM configuration vectors as further training examples, the vector of vulnerabilities being modified for each further VM configuration vector by a reverse decay function such that each temporally earlier VM configuration is associated with a modified vector of vulnerabilities indicating vulnerability to a lesser degree.

7. A non-transitory computer-readable storage element comprising computer program code to, when loaded into a computer system and executed thereon, cause the computer system to perform the method as claimed in claim 1.

* * * * *